United States Patent [19]

Ford

[11] 4,242,207
[45] Dec. 30, 1980

[54] FILTER AND FLUID ANALYSIS SYSTEM

[75] Inventor: Gregory A. Ford, Bartlesville, Okla.

[73] Assignee: Phillips Petroleum Company, Bartlesville, Okla.

[21] Appl. No.: 6,955

[22] Filed: Jan. 25, 1979

[51] Int. Cl.³ .............................................. B01D 39/06
[52] U.S. Cl. ................................. 210/500.1; 55/269; 55/527; 422/101
[58] Field of Search .............. 210/186, 198 C, 500 R, 210/500 M, 502, 411; 55/522, 527, 269; 422/68, 101

[56] References Cited

U.S. PATENT DOCUMENTS

| | | | |
|---|---|---|---|
| 2,520,124 | 8/1950 | Chaney et al. | 55/527 |
| 2,914,453 | 11/1959 | Wennerberg | 204/186 |
| 3,086,965 | 4/1963 | Weedman | 260/94.6 |
| 3,557,536 | 1/1971 | Rice | 55/269 |
| 3,557,955 | 1/1971 | Hirs et al. | 210/500 X |
| 3,600,463 | 8/1971 | Hagemeyer, Jr. et al. | 260/878 B |
| 3,918,907 | 11/1975 | Stephens | 422/68 X |

Primary Examiner—William A. Cuchlinski, Jr.

[57] ABSTRACT

A regenerable filter for removing low molecular weight polymeric material from a fluid sample stream that is to be directed to an analyzer comprising a filter bed of particles of a synthetic polymer which at the temperature employed in the filter does not melt or react with or dissolve in the sample stream. Also disclosed is a fluid analysis system comprising said regenerable filter in conjunction with an analyzer.

20 Claims, 2 Drawing Figures

FILTER AND FLUID ANALYSIS SYSTEM

This invention relates to filtration. In another aspect this invention relates to obtaining samples suitable for being analyzed by an analyzing instrument.

In the commercial production of various polymers, it is routine procedure to make periodic tests or analyses of various process streams. Such tests or analyses are of utmost importance in maintaining process control. Many of the process streams contain large amounts of low molecular weight polymer, generally having molecules of 2–25 monomers. These low molecular weight polymers are usually dissolved in the liquid process stream and upon vaporization of the liquid process stream are generally present in the form of finely divided, usually fibrous solids which may best be described as "cobwebs". These solids readily deposit on equipment surfaces such as tubing and sample valves. In order to obtain meaningful analyses and not foul the analyzer system it is necessary to remove these low molecular weight polymers from the sample being sent to the analyzer.

Ordinary filters such as porous disks or porous fabrics, have been found to be unsatisfactory as a primary means of removing these low molecular weight polymers because the polymers quickly form a relatively impervious mat on the filter, causing high pressure drops and/or reduced sample flow rates. Once such ordinary filters have become effectively plugged by the polymer, it has been necessary to disassemble the filter and replace each plugged filter element with a fresh filter element. Such manipulations and interruptions of the sampling are obviously not desirable in an on-stream process control system.

Accordingly, an object of the present invention is to provide a filter for removing low molecular weight polymers from a sample stream which filter is regenerable without disassembly.

A further object of the present invention is to provide a filter which is effective in removing low molecular weight polymers for longer periods of time than conventional filter.

Yet another object of the present invention is to provide an improved fluid analysis system for analyzing fluid streams containing low molecular weight polymers that interfere with analysis.

Other aspects, objects and advantages of the present invention will be apparent from the following description and the appended drawings.

In accordance with the instant invention there is provided a regenerable filter comprising a receptacle having an inlet and an outlet, a filter bed lying between said inlet and said outlet, wherein said filter bed comprises particles of a synthetic polymer which at the temperature employed in the filter does not melt or react with or dissolve in the fluid sample. In a preferred embodiment the receptacle is heat conductive and there is heating means positioned about the receptacle for heating said receptacle and said filter bed.

The particles of synthetic polymer employed to make up the filter bed can comprise any suitable polymer. Examples of suitable polymers include polytetrafluoroethylene, polytrifluorochloroethylene, polycarbonate, polyarylene sulfide, polymethyl methacrylate, polypropylene, and polyethylene. A suitable polytetrafluoroethylene is available commercially under the trademark of Teflon. A polytrifluorochloroethylene is available commercially under the trademark of Kel-F. A polyarylene sulfide is available commercially under the trademark of Ryton from Phillips Petroleum Company of Bartlesville, Oklahoma. Ryton is a poly(para-phenylene sulfide).

The particles can be in any convenient size and shape which will provide a porous bed with fairly high surface area while at the same time not providing too much resistance to flow of the fluid sample. The polymer particles are desirably dimensioned such that they will not pass through a 100 gauge mesh screen. In one preferred embodiment the particles are in the form of thin polygons being less than about 0.5 mm thick and having a major linear dimension of less than about 2 mm. In another preferred embodiment the particles are in the form of strands less than about 5 mm wide and less than about 0.5 mm thick. One convenient source of such strands are the polymer turnings obtained from lathe operations on the polymer. Such strands provide a filter bed providing a very tortuous path resembling what would be provided by packed steel wool. It is to be noted that the particles can be in other forms. Polymer pellets, granules, or even extruded forms may be employed.

Preferably the holdup of sample in the filter should be small. The particles are, therefore, generally placed in the receptacle in such an amount that the superficial velocity through the packed bed is in the range about 0.5 to about 20 feet/min. The bed length/width ratio is preferably in the range of 4/1 to 20/1. It is especially preferred that the holdup in the filter be less than about 30 seconds for some applications.

Also in accordance with the instant invention there is provided a fluid analysis system comprising a regenerable filter as above described, analyzer means, a line for providing polymer-containing fluid sample to the regenerable filter, a line for conveying filtered fluid sample from the regenerable filter to the analyzer means, and means for providing regenerating fluid to said regenerable filter. In a more preferred embodiment the fluid analysis system includes two regenerable filters and means for alternately providing regenerating fluid to one of said filters while the other is filtering fluid sample to be passed to the analyzer means.

Additional understanding of the present invention will be provided by reference to the appended drawings wherein.

Figure 1:
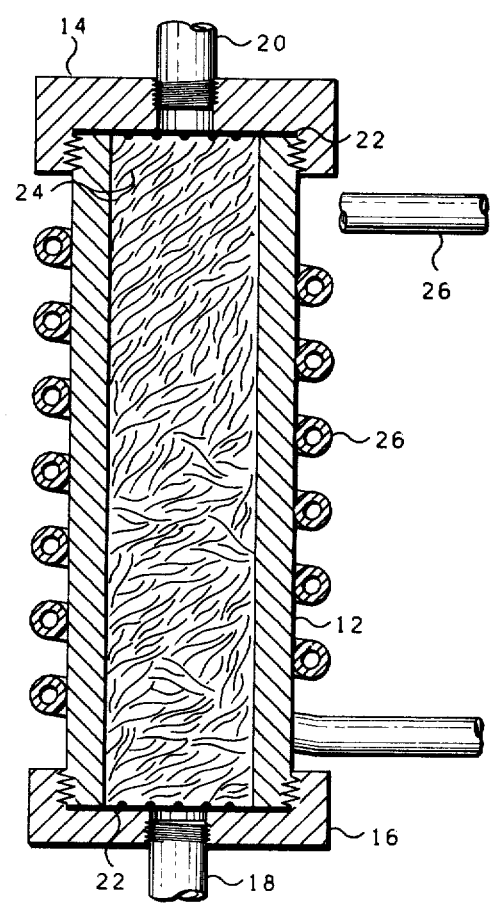
FIG. 1 is a cross-sectional view of a filter having the feature of the instant invention.

Referring now to FIG. 1, the filter 10 is constructed of a length of pipe 12 threaded on each end and having end couplings 14 and 16 attached thereto. End coupling 16 is connected to an inlet line 18 and end coupling 14 is connected to an outlet line 20. Positioned between each end coupling and the pipe there is a 100 gauge mesh screen 22. The interior of the filter is packed with strands of a suitable synthetic polymer to form a filter bed 24.

Encompassing the exterior of the central portion of the pipe 12 is a section of coiled tubing 26 through which steam or some other heated fluid can be circulated. The tubing 26, which is formed of heat conductive material, snuggly engages the pipe 12 to allow for indirect heating of the filter bed. The use of a heated filter bed is particularly useful where elevated temperatures must be maintained in order to preclude undesirable condensation of a vaporous sample fluid.

Figure 2:
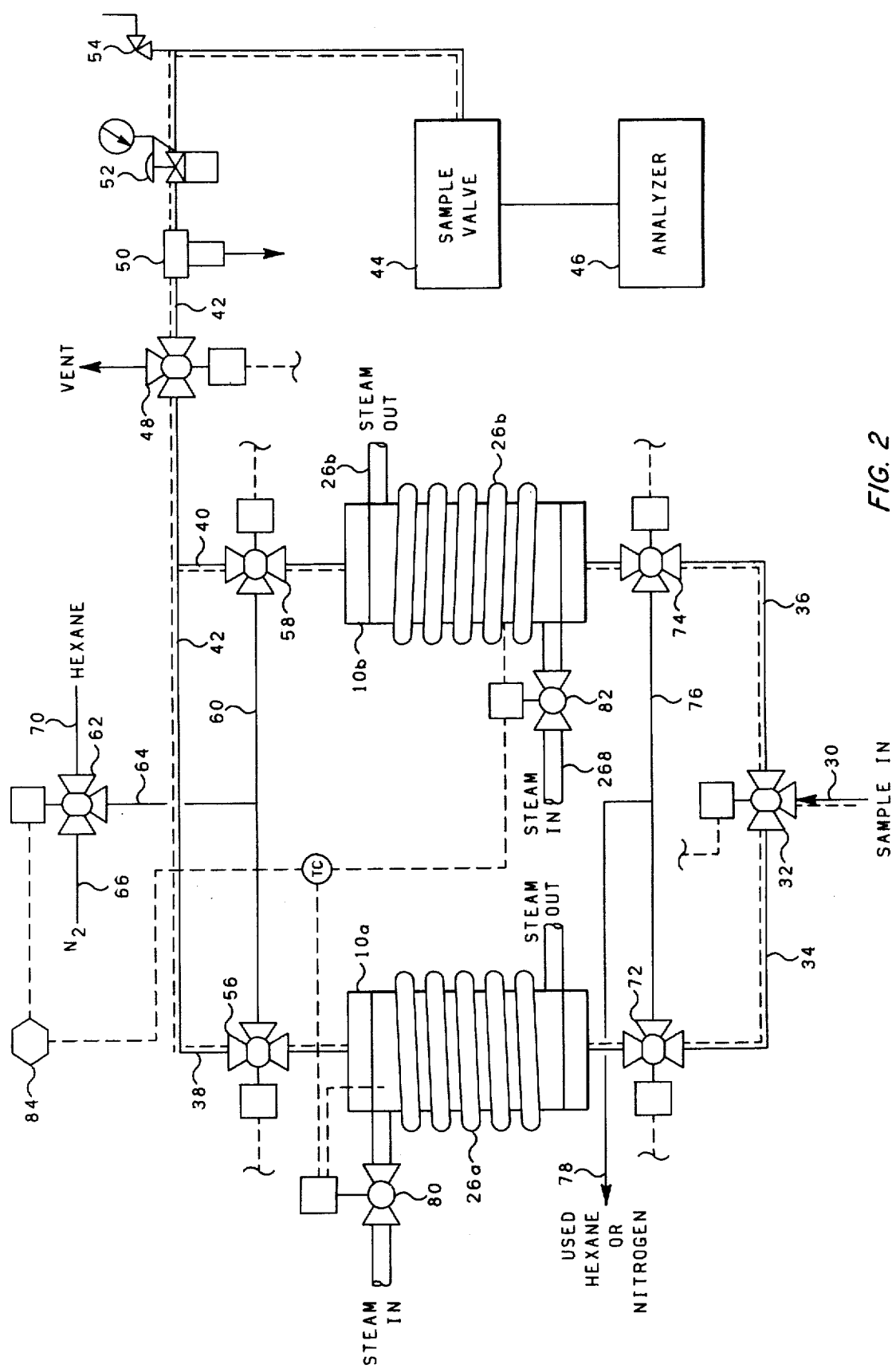
FIG. 2 is a schematic view of a fluid analysis sytem having the features of the instant invention.

Referring now to FIG. 2 where there is illustrated a fluid analysis system employing two novel filters 10a and 10b of the type herein disclosed. Tubing 30 connects a three-way valve 32 to a source of the sample fluid. Tubing 34 connects one outlet of valve 32 to filter 10a. Tubing 36 connects the other outlet of valve 32 to filter 10b. Tubing 38 is connected to the outlet of filter 10a and tubing 40 is connected to the outlet of filter 10b. Tubing 42 connects tubes 38 and 40 to a sample valve 44 which in turn is connected to an analyzer 46. The analyzer 46 can be, for example, a chromatographic column and an associated detector means.

The tubing 42 contains a three-way valve 48 which provides a vent for the purging of the filter beds. The tubing further includes a by-pass filter 50, a regulator 52, and a relief valve 54. The by-pass filter 50 is provided to act as a guard filter to retain any particles above a given size not retained by filters 10a or 10b. Any in-line type filter which provides positive filtration of particles down to a desired cutoff size may be used. One suitable filter is supplied by the Balston Co., Lexington, Mass. as Model 95-S which uses an epoxied fiberglass medium for retaining particles 0.6 micron or larger.

Tubing 38 contains a three-way valve 56. Tubing 40 contains a three-way valve 58. Tubing 60 is connected to one of the ports of both valves 56 and valve 58. Tubing 60 is connected to a three-way valve 62 via tubing 64. One port of valve 62 is connected to a source of nitrogen via tubing 66. The other port of valve 68 is connected to a source of hexane via tubing 70.

Tubing 34 also contains a three-way valve 72 and tubing 36 a three-way valve 74. Tubing 76 connects a port of valve 72 to a port of valve 74. An exhaust line for used hexane and nitrogen is provided by tubing 78.

The filters 10a and 10b have in association therewith respective steam lines 26a and 26b. Steam lines 26a and 26b have valves 80 and 82 respectively therein for controlling the flow of steam and thus the temperature in the respective filters.

A programmable controller 84 is provided for controlling the various valves of the illustrated system.

In the illustration of FIG. 2 the dotted lines associated with the various tubing lines are intended to denote that those portions of the system have light steam tracing to heat those lines. Suitable steam tracing equipment is available under the tradename Dekoron. The steam tracing is used to maintain the sample in the lines at a temperature above its dew point.

The regulator 52 is also steam heated. Preferably asbestos insulation is included between the regulator and the steam heat source to preclude the formation of localized hot spots which could promote polymerization of monomers and/or oligomers in the filter fluid sample.

The operation of the system illustrated in FIG. 2 in connection with the analysis of process streams in the production of butyl polymers will now be described. In a specific embodiment the filters 10a and 10b are constructed from 2-inch diameter pipe and are about 12 inches long. A $C_4$ vapor stream containing entrained low molecular weight butyl polymers flows at about 1000-2000 cm$^3$/min. at 15 psig into line 30. The systems temperature is maintained by steam tracing using 80 psig (324° F.) steam.

Generally when the fluid sample is vaporous ¼-inch tubing is employed and when the fluid sample is liquid ⅛-inch tubing is employed.

Valve 32 directs the fluid sample to either filter 10a or 10b. The filtered fluid from filters 10a and 10b passes through respective valve 56 or 58 into line 42 and through valve 48 to the filter 50, and then through the heated regulator 52 and sample valve 44 to the analyzer 46.

After fluid sample has flowed through one of the filters say 10a for a selected amount of time the controller 84 will switch valve 32 to redirect fluid sample to filter 10b. Valve 62 will be switched to allow the solvent from line 64 to flow into and back-flush the filter 10a. Valve 72 is switched so that flush solvent flows out of the filter and through line 78 to a point of disposal or recovery. After a selected period of time valve 62 is switched by the controller 84 to replace the solvent flow with a purging gas, e.g. nitrogen. The solvent and the gas are employed at elevated pressure and temperature. Generally the maximum pressure is about 4,000 psig (27.6 mPa) and the maximum temperature is about 450° F. (232° C.).

The controller 84 also adjusts the valves 80 and 82 to vary the temperature of the filters depending upon the cycle in which they are operating. For example, when fluid sample is flowing into the filter as a vapor the filter can be maintained at a temperature of, for example, about 85° C. (185° F.), during the hexane backflushing and cleaning the temperature of the filter can be raised to, for example, about 176° C. (350° F.), and during the nitrogen purging the temperature of the filter bed can be dropped into the range of, for example, about 85° to about 110° C. (about 185° to about 230° F.). If desired one can also program the programmer such that valve 62 switches to provide a nitrogen purge prior to the solvent backwashing. For such a nitrogen purge generally a more elevated temperature would be employed in the filter bed, i.e. about 176° C. (350° F.).

When a filter is connected back to the sample fluid after having been backwashed, the controller shuts valve 48 for a short period of time to allow venting of higher pressure material in the lines.

Having a programmable controller is, of course, optional. A simple cam timer arrangement could be used for controlling all the valves as desired.

Although this invention has been explained above in reference to specific embodiments, it is to be noted that there are various modifications and variations that can be employed without departing from the scope of this invention as set forth in the following claims.

What is claimed is:

1. A regenerable filter for use in removing low molecular weight polymers from a fluid stream comprising a receptacle having an inlet and an outlet, a filter bed lying between said inlet and said outlet wherein said filter bed comprises particles of synthetic polymer selected from polytetrafluoroethylene and polyarylene sulfide which at the temperature employed in the filter does not melt or react with or dissolve in the fluid sample.

2. A regenerable filter according to claim 1 wherein said particles of synthetic polymer are in the form of strands less than about 5 mm wide and less than about 0.5 mm thick.

3. A regenerable filter according to claim 2 wherein said particles of synthetic polymer are of polytetrafluoroethylene.

4. A regenerable filter according to claim 1 wherein said particles of synthetic polymer are in the form of polygons being less than about 0.5 mm thick and having a major linear dimension of less than about 2 mm.

5. A regenerable filter according to claim 4 wherein said particles of synthetic polymer are of polyarylene sulfide.

6. A regenerable filter according to claim 1 wherein the particles of synthetic polymer are dimensioned such that they will not pass through a 100 mesh screen.

7. A regenerable filter according to claim 6 wherein a 100 mesh screen separates the filter bed from both the outlet and the inlet of said receptacle.

8. A regenerable filter according to claim 7 wherein said receptacle is heat conductive and said receptacle has associated therewith heating means for heating said receptacle and said filter bed.

9. A regenerable filter according to claim 8 wherein said particles of synthetic polymer are of polyarylene sulfide.

10. A regenerable filter according to claim 8 wherein said particles of synthetic polymer are of polytetrafluoroethylene.

11. A regenerable filter according to claim 1 wherein said receptacle is heat conductive and said receptacle has associated therewith heating means for heating said receptacle and said filter bed.

12. A fluid anaylsis system comprising a regenerable filter comprising a receptacle having an inlet and a outlet and a filter bed lying between said inlet and said outlet wherein said filter bed comprises particles of synthetic polymer which at the temperature employed in the filter does not melt or react with or dissolve in the sample fluid, first conduit means for providing sample fluid to the inlet of said filter, an analyzer means, second conduit means for carrying filtered sample fluid to said analyzer means, and means for providing regenerating fluid to said regenerable filter.

13. A fluid analysis system according to claim 12 wherein said filter, said first conduit means, and said second conduit means have heating means associated therewith to heat the material contained within.

14. A fluid analysis system according to claim 13 wherein said particles of synthetic polymer are of polyarylene sulfide or polytetrafluoroethylene dimensioned such that they will not pass through a 100 mesh screen.

15. A fluid analysis system according to claim 14 wherein said particles of synthetic polymer are of polyarylene sulfide or polytetrafluoroethylene dimensioned such that they will not pass through a 100 mesh screen.

16. A fluid analysis system comprising, first and second regenerable filters each comprising a receptacle having an inlet and an outlet, and a filter bed interposed between said inlet and said outlet, wherein said filter bed comprises particles of synthetic polymer which at the temperature employed in the filter do not melt or react with or dissolve in the sample fluid, an analyzer means capable of analyzing at least a portion of filtered fluid sample, conduit means for supplying fluid sample to said regenerable filters, valve means for controlling the flow of fluid sample to said regenerable filters, conduit means for conveying filtered fluid sample to said analyzer, conduit means for conveying regenerating fluid to said regenerable filters, valve means for controlling the flow of regenerating fluid to said regenerable filters, conduit means for conveying used regenerating fluid away from said regenerable filters, a valve controller adapted to operate the various valve means so that when one regenerable filter is being used to filter said fluid sample the other regenerable filter is being contacted with regenerating fluid.

17. A fluid analysis system according to claim 16 wherein said regenerable filters have heat conductive receptacles and said receptacles have heating means associated therewith for heating the material contained within and wherein there are heating means associated with said conduit means for supplying fluid sample to the filter and for supplying filtered fluid sample to the analyzer to heat the fluid passing therethrough.

18. A fluid analysis system according to claim 17 wherein said conduit means for conveying filtered fluid sample to said analyzer has a valve therein which can be operated to vent said conduit means.

19. A fluid analysis system according to claim 18 wherein there is a steam heated regulator in the conduit means for conveying filtered fluid sample to the analyzer and wherein there is a by-pass filter positioned in said conduit means between said regenerable filter and said analyzer.

20. A fluid analysis system according to claim 19 having a by-pass filter means positioned in the conduit means for conveying filtered fluid to said analyzer, said by-pass filter being positioned upstream of said steam heated regulator and being designed so as to retain any particles flowing from said regenerable filters that would interfere with the analysis.

* * * * *